United States Patent
Kiyota et al.

(10) Patent No.: US 8,885,230 B2
(45) Date of Patent: Nov. 11, 2014

(54) IMAGE SENSOR UNIT AND IMAGE READING APPARARTUS

(75) Inventors: Hideo Kiyota, Saitama (JP); Hidemasa Yoshida, Saitama (JP)

(73) Assignee: Canon Components, Inc. (JP)

(*) Notice: Subject to any disclaimer, the term of this patent is extended or adjusted under 35 U.S.C. 154(b) by 207 days.

(21) Appl. No.: 13/315,747

(22) Filed: Dec. 9, 2011

(65) Prior Publication Data

US 2012/0147442 A1    Jun. 14, 2012

(30) Foreign Application Priority Data

Dec. 10, 2010    (JP) .................................. 2010275892

(51) Int. Cl.
| | | |
|---|---|---|
| H04N 1/04 | (2006.01) | |
| H04N 1/028 | (2006.01) | |
| H04N 1/024 | (2006.01) | |
| H04N 1/031 | (2006.01) | |

(52) U.S. Cl.
CPC ......... *H04N 1/0249* (2013.01); *H04N 1/02835* (2013.01); *H04N 1/0318* (2013.01); *H04N 2201/02497* (2013.01)
USPC ............ 358/475; 358/484; 358/483; 358/482

(58) Field of Classification Search
CPC ... H04N 1/028; H04N 1/193; H04N 1/02885; H04N 1/40056; H04N 1/1013; H04N 1/0287; H04N 1/02815; H04N 1/02835; H04N 3/1581; H04N 1/031; H04N 1/03; H04N 2201/03112; H04N 1/484; H04N 1/12; H01L 27/14665
See application file for complete search history.

(56) References Cited

U.S. PATENT DOCUMENTS

| | | | |
|---|---|---|---|
| 5,119,232 A | 6/1992 | Daley et al. | |
| 5,166,832 A | 11/1992 | Zychowicz | |
| 5,182,445 A | 1/1993 | Yamashita | |
| 5,263,077 A | 11/1993 | Cowan et al. | |
| 5,780,840 A | 7/1998 | Lee et al. | |

(Continued)

FOREIGN PATENT DOCUMENTS

| | | |
|---|---|---|
| CN | 101052088 A | 10/2007 |
| EP | 0 844 784 A2 | 11/1997 |

(Continued)

OTHER PUBLICATIONS

International Search Report for PCT/JP2010/069500, mail date Nov. 30, 2010. Cited in U.S. Appl. No. 13/519,353. See USPGP Cite 1.

(Continued)

*Primary Examiner* — Cheukfan Lee
(74) *Attorney, Agent, or Firm* — Rossi, Kimms & McDowell LLP

(57) ABSTRACT

A configuration is adopted in which an image sensor unit includes: a sensor substrate on which a plurality of photoelectric conversion elements are mounted; a light source that includes light-emitting elements and is for illuminating a document; a light guide that guides light from the light source from one end face in a longitudinal direction and linearly illuminates the document; a rod lens array imaging reflected light from the document on the sensor substrate; and a frame attaching each of these, and in which the frame detachably includes a spacer provided in proximity to the light source, and the spacer includes a light shielding roof elongated so as to cover the light source and the end of the light guide.

14 Claims, 18 Drawing Sheets

(56) References Cited

U.S. PATENT DOCUMENTS

| | | | |
|---|---|---|---|
| 5,864,408 A | 1/1999 | Kumashiro | |
| 5,953,133 A | 9/1999 | Fujimiya et al. | |
| 6,094,281 A | 7/2000 | Nakai et al. | |
| 6,166,832 A | 12/2000 | Fujimoto | |
| 6,426,807 B1 * | 7/2002 | Kawai et al. | 358/484 |
| 6,486,974 B1 | 11/2002 | Nakai et al. | |
| 6,538,243 B1 | 3/2003 | Bohn et al. | |
| 6,724,503 B1 | 4/2004 | Sako et al. | |
| 6,791,721 B1 | 9/2004 | Konogaya et al. | |
| 6,892,945 B2 | 5/2005 | Shishido | |
| 7,190,493 B2 | 3/2007 | Maki et al. | |
| 7,284,891 B2 | 10/2007 | Saito | |
| 7,538,911 B2 | 5/2009 | Sakurai et al. | |
| 7,593,143 B2 | 9/2009 | Herloski | |
| 7,722,223 B2 | 5/2010 | Saito et al. | |
| 7,760,403 B2 | 7/2010 | Sakurai | |
| 7,796,310 B2 | 9/2010 | Hasegawa et al. | |
| 7,859,726 B2 | 12/2010 | Endo et al. | |
| 7,903,298 B2 | 3/2011 | Sawada et al. | |
| 8,018,630 B2 | 9/2011 | Herloski | |
| 8,049,937 B2 | 11/2011 | Saito | |
| 8,228,567 B2 | 7/2012 | Kim | |
| 8,310,737 B2 | 11/2012 | Nagao et al. | |
| 8,422,091 B2 | 4/2013 | Yamaguchi | |
| 8,467,108 B2 | 6/2013 | Shimatani | |
| 2002/0114152 A1 | 8/2002 | Fujino et al. | |
| 2005/0150956 A1 | 7/2005 | Ikeda et al. | |
| 2005/0195618 A1 | 9/2005 | Uemura et al. | |
| 2006/0008295 A1 | 1/2006 | Kohchi et al. | |
| 2006/0152942 A1 | 7/2006 | Saito et al. | |
| 2007/0252069 A1 | 11/2007 | Oguchi | |
| 2007/0268529 A1 | 11/2007 | Kuse | |
| 2007/0285740 A1 | 12/2007 | Onishi et al. | |
| 2008/0068682 A1 | 3/2008 | Morikawa | |
| 2008/0112017 A1 | 5/2008 | Nagasaka | |
| 2009/0003000 A1 | 1/2009 | Saito et al. | |
| 2009/0027743 A1 | 1/2009 | Han | |
| 2009/0034030 A1 | 2/2009 | Nagatani et al. | |
| 2009/0080213 A1 * | 3/2009 | Onishi et al. | 362/551 |
| 2009/0127569 A1 * | 5/2009 | Sawada et al. | 257/82 |
| 2009/0218525 A1 | 9/2009 | Ikeda et al. | |
| 2009/0294630 A1 | 12/2009 | Saito et al. | |
| 2010/0046045 A1 | 2/2010 | Nagao et al. | |
| 2010/0231987 A1 | 9/2010 | Takeuchi | |
| 2012/0154876 A1 | 6/2012 | Shimoda | |
| 2012/0154877 A1 | 6/2012 | Kisara et al. | |
| 2012/0162727 A1 | 6/2012 | Shimoda et al. | |
| 2012/0287484 A1 | 11/2012 | Shimoda et al. | |
| 2013/0009037 A1 | 1/2013 | Takahashi | |
| 2013/0038912 A1 | 2/2013 | Horiguchi et al. | |
| 2013/0038913 A1 | 2/2013 | Shimoda et al. | |
| 2013/0038914 A1 | 2/2013 | Yoshida et al. | |
| 2013/0181311 A1 | 7/2013 | Sugiyama | |
| 2013/0265617 A1 | 10/2013 | Murakami et al. | |

FOREIGN PATENT DOCUMENTS

| | | |
|---|---|---|
| EP | 1 049 055 A2 | 4/2000 |
| EP | 1 471 472 A2 | 4/2004 |
| EP | 2 246 825 A1 | 4/2009 |
| JP | 04-150454 | 5/1992 |
| JP | 08-223417 A | 8/1996 |
| JP | 8-223417 A | 8/1996 |
| JP | 09-214675 A | 8/1997 |
| JP | 10-285330 A | 10/1998 |
| JP | 11-75015 A | 3/1999 |
| JP | 11-084544 | 3/1999 |
| JP | 2000-324308 | 11/2000 |
| JP | 2001-005122 A | 1/2001 |
| JP | 2001-223852 | 8/2001 |
| JP | 2001-272677 | 10/2001 |
| JP | 2003-037717 A | 2/2003 |
| JP | 2003-046726 A | 2/2003 |
| JP | 2003-281913 A | 10/2003 |
| JP | 2004-146870 A | 5/2004 |
| JP | 2005-198106 A | 7/2005 |
| JP | 2005-223424 A | 8/2005 |
| JP | 2006-311232 A | 11/2006 |
| JP | 3885088 B2 | 11/2006 |
| JP | 2007-116590 A | 5/2007 |
| JP | 2007-194797 A | 8/2007 |
| JP | 2007-300536 A | 11/2007 |
| JP | 2008-042425 | 2/2008 |
| JP | 2008-42425 A | 2/2008 |
| JP | 2008-112301 A | 5/2008 |
| JP | 2008124788 A | 5/2008 |
| JP | 2009-053316 A | 3/2009 |
| JP | 2009-086488 A | 4/2009 |
| JP | 2010-136061 A | 6/2010 |
| JP | 2010213039 A | 9/2010 |
| JP | 2011-124741 A | 6/2011 |
| WO | 97/23991 | 7/1997 |
| WO | 2006/137263 A1 | 12/2006 |
| WO | 2007/077760 A1 | 7/2007 |
| WO | 2008/013234 A1 | 1/2008 |

OTHER PUBLICATIONS

Office Action issued in Corresponding Japanese Patent Application No. 2010-282128 dated Nov. 6, 2012.Cited in related co-pending U.S. Appl. No. 13/328,553.
Specification and drawings for related co-pending U.S. Appl. No. 13/328,553, filed Dec. 16, 2011.
Specification and drawings for related co-pending U.S. Appl. No. 13/338,418, filed Dec. 28, 2011.
Specification and drawings for related co-pending U.S. Appl. No. 13/333,751, filed Dec. 21, 2011.
Extended European Search Report for EP 11194502.8, mail date Dec. 4, 2012. Cited in related U.S. Appl. No. 13/333,751.
Japanese Office Action for JP 2011-236415, mail date Nov. 13, 2012. Cited in related U.S. Appl. No. 13/333,751.
Japanese Office Action for corresponding JP 2012-247653, mail date Dec. 11, 2012.
Cheng Hong et al. "A color correction method based on standard white board" Journal of Agricultural University of Hebei, vol. 30, No. 4, pp. 105-109, Jul. 2007. English Abstract provided. Cited in U.S. pending related U.S. Appl. No. 13/333,751.
Office Action issued in Chinese Application No. 201110431991.5 dated Jan. 3, 2014. Cited in U.S. pending related U.S. Appl. No. 13/333,751.
European Search Report issued in EP12179608.0, dated Nov. 21, 2012. Cited in related U.S. Appl. No. 13/467,357.
European Office Action issued in EP12167240.6, dated May 17, 2013. Cited in related U.S. Appl. No. 13/467,357.
Japanese Office Action issued in JP2010-293227, dated Dec. 11, 2012. Cited in related U.S. Appl. No. 13/338,418.
Japanese Office Action issued in JP2012-087401, dated Apr. 30, 2013. Cited in related U.S. Appl. No. 13/467,357.
Korean Office Action issued in KR10-2012-49430, dated Jun. 27, 2013. Cited in related U.S. Appl. No. 13/467,357.
Japanese Office Action issued in application No. JP2012-163536, dated Sep. 17, 2013. Cited in related U.S. Appl. No. 13/570,970.
Taiwanese Office Action TW99138186, dated May 27, 2014. Cited in pending related U.S. Appl. No. 13/519,353.

* cited by examiner

FIG.14

| | WITHOUT SHIELDING ROOF 20 | | WITH SHIELDING ROOF 20 (ABSORBING SURFACE) | | WITH SHIELDING ROOF 20 (REFLECTING SURFACE) | |
|---|---|---|---|---|---|---|
| | OUTPUT (mV) | DECREASING RATE (%) | OUTPUT (mV) | DECREASING RATE (%) | OUTPUT (mV) | DECREASING RATE (%) |
| R | 317.0 | 0 | 215.8 | 31.9 | 288.8 | 8.9 |
| B | 348.5 | 0 | 246.2 | 29.4 | 317.9 | 8.8 |
| G | 429.7 | 0 | 301.8 | 29.8 | 410.4 | 4.5 |

IMAGE SENSOR UNIT AND IMAGE READING APPARARTUS

CROSS-REFERENCE TO RELATED APPLICATIONS

This application is based upon and claims the benefit of priority of the prior Japanese Patent Application No. 2010-275892, filed on Dec. 10, 2010, the entire contents of which are incorporated herein by reference.

BACKGROUND OF THE INVENTION

1. Field of the Invention

The present invention relates to a contact image sensor unit and an image reading apparatus using the contact image sensor unit.

2. Description of the Related Art

In an image sensor unit where a light source is arranged in proximity to an end face in a longitudinal direction (main scanning direction) of a light guide, leakage light is emitted from a gap between the light source and the light guide. Accordingly, illumination distribution cannot be maintained uniform in the main scanning direction.

Thus, an image sensor described in Patent Document 1 has been proposed by this applicant.
Patent Document 1
International Publication Pamphlet No. WO2008/013234

The image sensor described in Patent Document 1 has a configuration in which a part of a light guide cover is extended and thereby the light guide end and a light-emitting element are covered with the part. Thus, an image sensor without using the light guide cover has a problem necessitating an additional part and increasing cost.

Further, the image sensor without using the light guide cover has a configuration in which the light guide end is covered with the light guide cover. Accordingly, it is required to attach the light guide by sliding, in assembly. There is a possibility of danger of causing scratches and the like on the light guide. In addition, there is a possibility of danger of expansion of the light guide owing to variation in ambient temperature and/or causing scratches and the like during contraction.

SUMMARY OF THE INVENTION

The present invention is made in view of these actual situations. It is an object of the present invention to provide an image sensor unit and an image reading apparatus that prevent leakage light without using an additional part, such as a light guide cover, allow uniform illumination distribution to be acquired and can facilitate miniaturization.

It is another object of the present invention to provide an image sensor unit and an image reading apparatus that can prevent the light guide and the platen glass from being scratched and worn.

An image sensor unit of the present invention includes: a sensor substrate on which a plurality of photoelectric conversion elements are mounted; a light source that includes a light-emitting element and is for illuminating a document; a light guide that guides light from the light source from one end face in a longitudinal direction and illuminates the document; an image forming element imaging reflected light from the document on the sensor substrate; and a supporting member attaching each of these, wherein the supporting member detachably includes a slide member provided in proximity to the light source, and the slide member includes a light shield elongated so as to cover the light source and an end of the light guide.

An image reading apparatus of the present invention uses an image sensor unit. The unit includes: a sensor substrate on which a plurality of photoelectric conversion elements are mounted; a light source that includes a light-emitting element and is for illuminating a document; a light guide that guides light from the light source from one end face in a longitudinal direction and illuminates the document; an image forming element imaging reflected light from the document on the sensor substrate; and a supporting member attaching each of these, wherein the supporting member detachably includes a slide member provided in proximity to the light source, and the slide member includes a light shield elongated so as to cover the light source and an end of the light guide.

BRIEF DESCRIPTION OF THE DRAWINGS

FIG. 14 is a diagram showing a measured result at a position of 1 PIX in a case of independent emission of RGB;

DETAILED DESCRIPTION OF THE PREFERRED EMBODIMENTS

Figure 1:
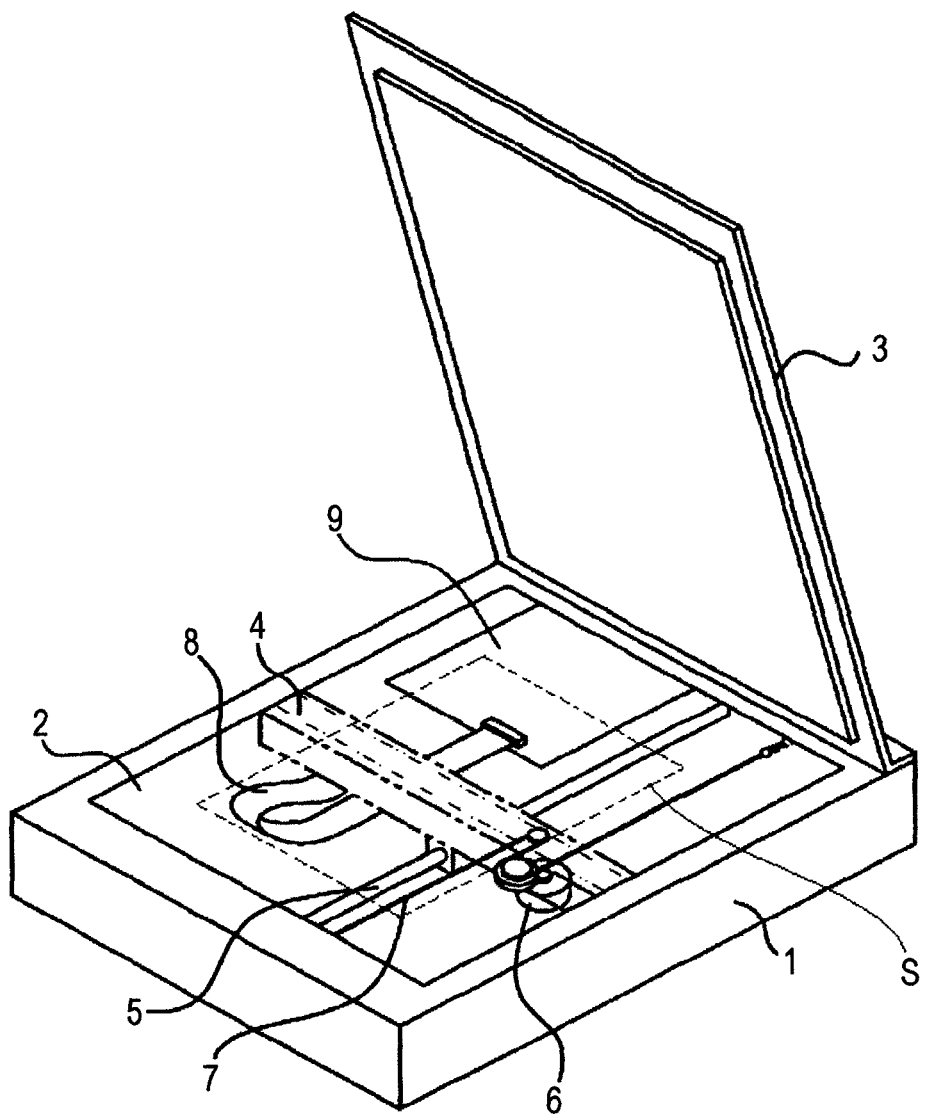
FIG. 1 is a perspective view showing a structure of an image scanner to which the present invention is applicable.

Embodiments of the present invention will hereinafter be described in detail on the basis of diagrams. FIG. 1 is a perspective view showing a structure of a flat bed scanner (image reading apparatus) to which the present invention is applicable.

Reference numeral 1 denotes a cabinet. The cabinet 1 is provided with a platen glass 2 including a transparent plate made of glass, which is a document stage, and a platen cover 3 arranged so as to be capable of opening and closing to cover a document S placed on the platen glass 2.

In the cabinet 1, an image sensor unit 4 is stored. As the image sensor unit 4, for instance, a contact image sensor (CIS) unit is employed. Reference numeral 5 denotes a slide shaft provided so as to be capable of moving the image sensor unit 4 along the platen glass 2. Reference numeral 6 denotes a drive motor. Reference numeral 7 denotes a wire. Reference numeral 8 denotes electric wiring, such as a flexible cable. The electric wiring 8 electrically connects the image sensor unit 4 and the signal processor 9 to each other.

This configuration drives the drive motor 6, thereby mechanically driving the wire 7 attached to the image sensor unit 4. This allows the image sensor unit 4 to be moved along the slide shaft 5 in a reading direction (sub-scanning direction).

Figure 2:
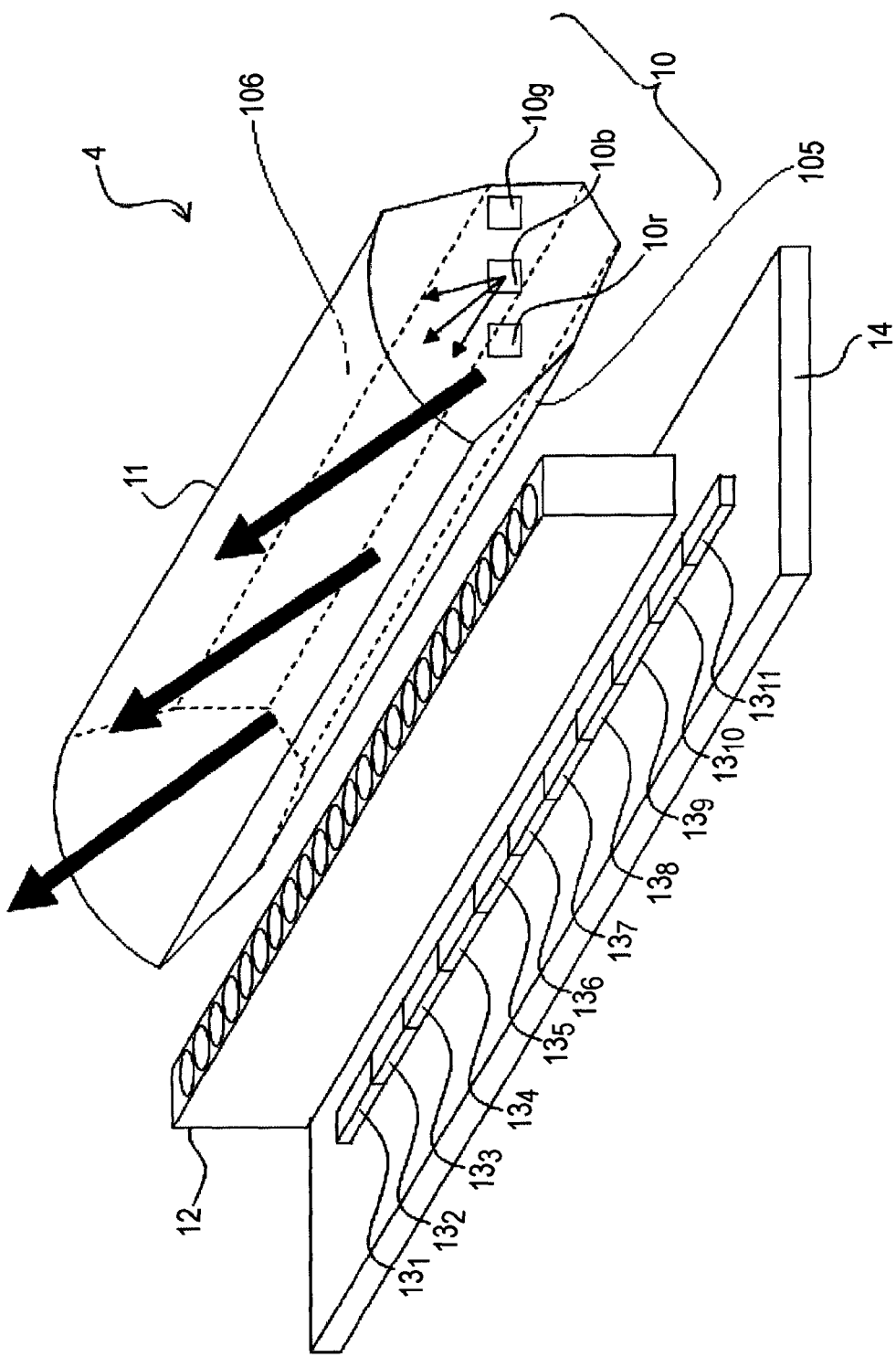
FIG. 2 is a schematic view showing an image sensor unit 4.

FIG. 2 is a schematic view showing a structure of the image sensor unit 4.

Reference numeral 10 denotes a light source for illuminating a document. The light source 10 is provided with light-emitting elements 10r, 10g and 10b including LEDs having emission wavelengths of three colors, or red, green and blue (hereinafter, simplified as RGB). A configuration is adopted that drives light-emitting elements 10r, 10g and 10b to sequentially emit light.

Note that a light source 10, or a white light source, may be adopted.

Reference numeral 11 denotes an elongated light guide that guides illumination light from the light source 10 to the document S. The light source 10 is arranged in proximity to one end face of the light guide 11 in the longitudinal direction, apart from the end face by a distance of a gap A (see FIG. 7).

Reference numeral 12 denotes a rod lens array as an image forming element. The rod lens array 12 has a configuration in which a plurality of erect equal magnification image-forming lens elements are arranged.

Reference numeral 13 denotes a photoelectric conversion element that converts reflected light (document image) imaged by the rod lens array 12 into an electric signal. Reference numeral 14 denotes a sensor substrate on which photoelectric conversion elements $13_k$ (k represents natural numbers from one to eleven) are mounted.

In this embodiment, the number of photoelectric conversion elements $13_k$ is eleven. However, the number of photoelectric conversion elements $13_k$ is not particularly limited.

According to the configuration, the image sensor unit 4 sequentially drives the light-emitting elements 10r, 10g and 10b, which are included in the light source 10, to emit light at the reading position immediately beneath the platen glass 2. Illumination light from the light source 10 is emitted in a diagonally above direction through the light guide 11, thereby illuminating a surface of the document S in the main scanning direction in a linear and substantially uniform manner. The illumination light from the light source 10 is reflected by the document S. The reflected light is converged and imaged by the rod lens array 12 on the photoelectric conversion elements $13_k$ provided on the sensor substrate 14. The reflected light is converted into the electric signal by the photoelectric conversion elements $13_k$, and processed by the signal processor 9.

One scan line of reflected light of all RGB is thus read, and completes a reading operation of the one scan line in the main scanning direction on the document S.

After completion of the reading operation of one scan line, the image sensor unit 4 further performs the reading operation of one scan line in an analogous manner while moving in the sub-scanning direction by one scan line and illuminating the document S with illumination light. The entire surface of the document S is scanned by repeating the reading operation.

Figure 3:
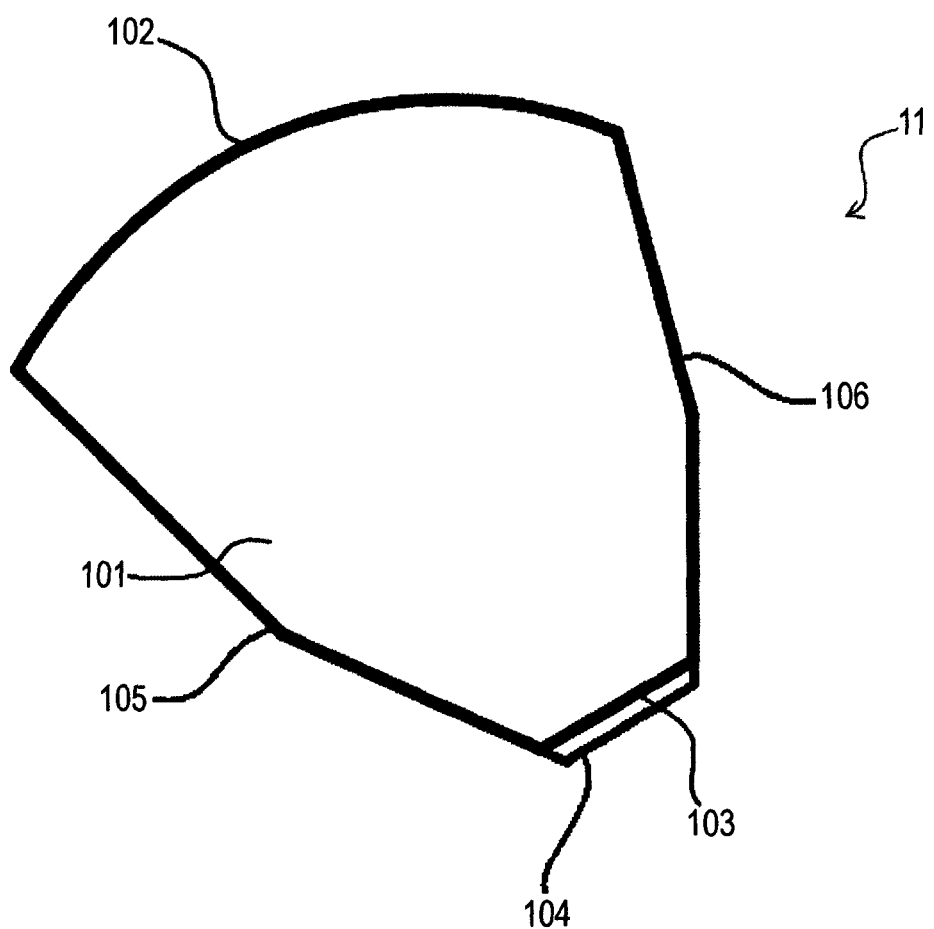
FIG. 3 is a sectional view of a light guide 11 in a sub-scanning direction.

FIG. 3 is a side view illustrating a structure of the light guide 11.

The light guide 11 is formed, for instance, of transparent plastic, such as acrylic.

Reference numeral 101 denotes is an incident surface provided at one side end face in the longitudinal direction (main scanning direction). The light source 10 is arranged in proximity to the incident surface 101 apart from this incident surface 101 by the distance of the gap A. Accordingly, the illumination light from the light source 10 is incident on the incident surface 101.

Reference numeral 102 denotes an emission surface provided along the longitudinal direction of the light guide 11. The emission surface emits the illumination light, having been emitted from the light source 10 and reflected and diffused in the light guide 11, in the direction of the document S. The emission surface 102 is convexly formed for the sake of condensing effect.

Reference numeral 103 denotes a reflecting surface provided on a surface opposite to the emission surface 102. A light diffusion pattern 104, for instance, made of light reflective coating by serigraphy and the like is formed on the reflecting surface 103. A configuration is adopted in which the distribution density of the light diffusion pattern 104 is low at a part close to the light source 10 and high at a part apart therefrom according to the distance from the light source 10.

Reference numerals 105 and 106 denote reflecting surfaces.

According to this configuration, illumination light from the light source 10 incident on the incident surface 101 provided on the light guide 11 into this light guide 11 propagates in the light guide 11 while being totally reflected by the reflecting surface 103 and the reflecting surfaces 105 and 106 in the light guide 11, and is emitted from the emission surface 102. At the same time, the light is diffused by the light diffusion pattern 104 provided on the reflecting surface 103 in the light guide 11, and emitted from the emission surface 102. As a result, the document S is illuminated in the main scanning direction in a linear and substantially uniform manner.

At this time, the illumination light from the light source 10 includes light incident on the incident surface 101 provided on the light guide 11 into this light guide 11, and light that is not incident on the light guide 11 but directly emitted in the direction toward the document S through the gap A.

Thus, the light not incident on the light guide but directly emitted in the direction toward the document is leakage light.

Figure 4:
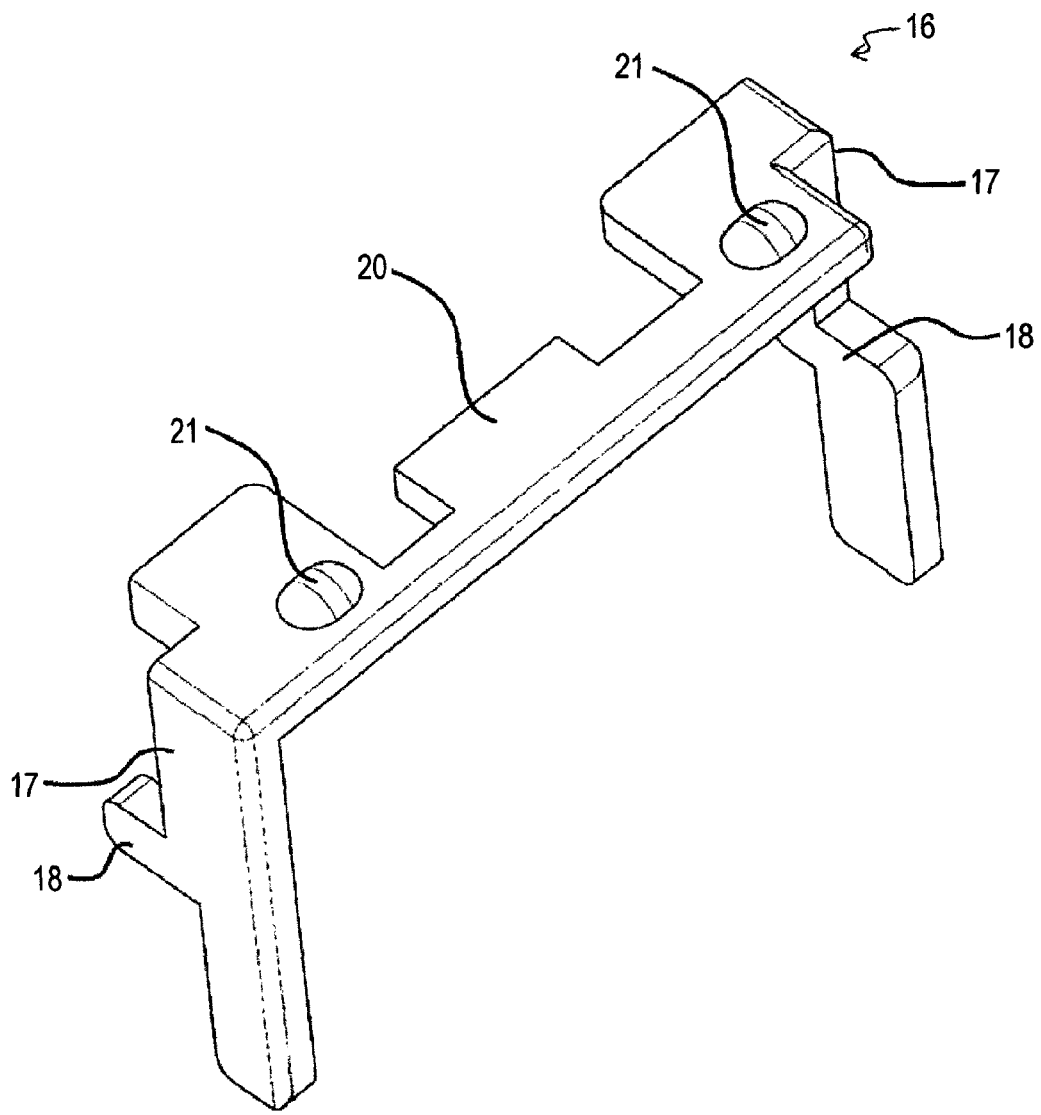
FIG. 4 is a perspective view of a spacer 16 to which the present invention is applicable.
Figure 5:
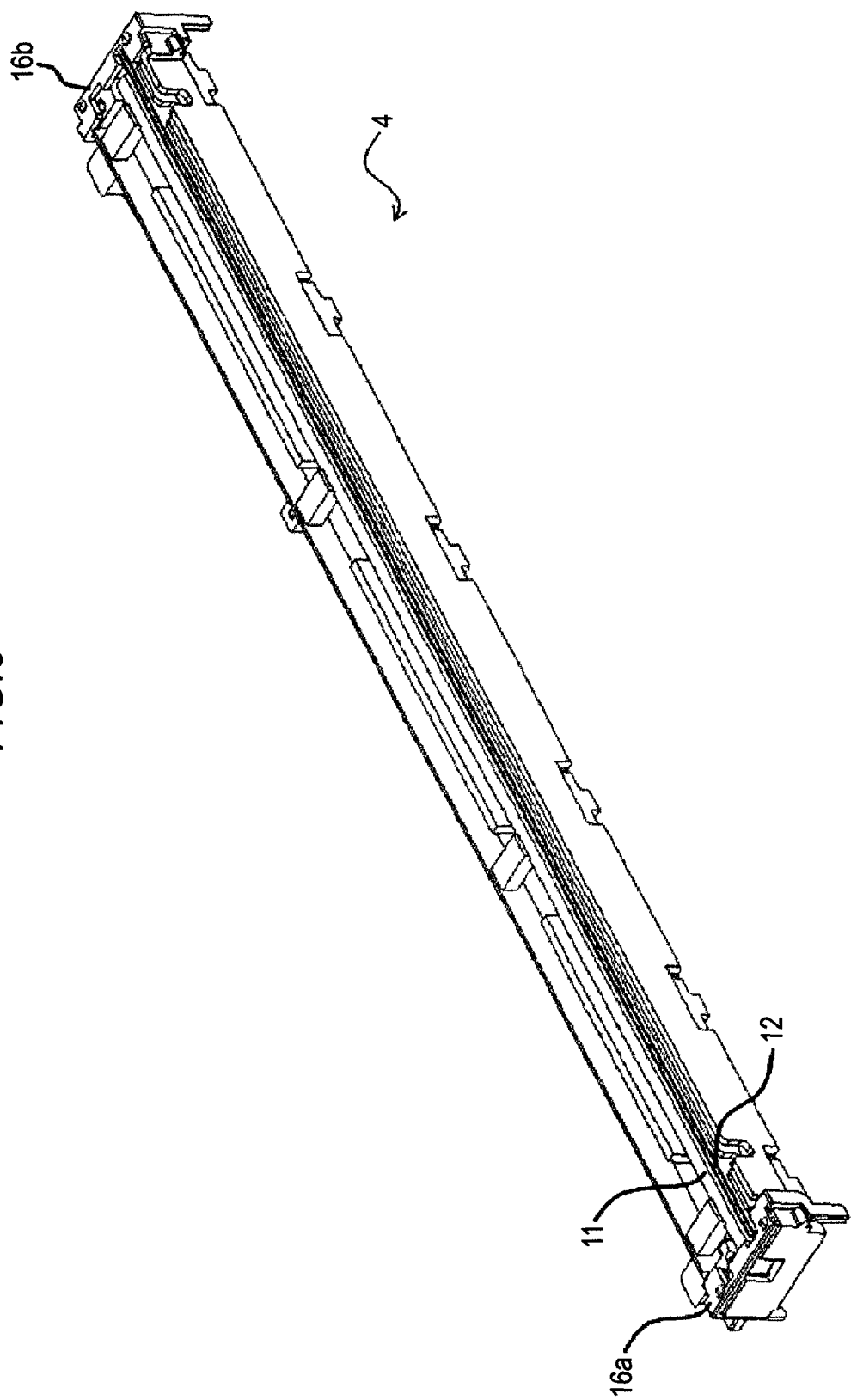
FIG. 5 is a perspective view showing a structure of the image sensor unit 4.
Figure 6:
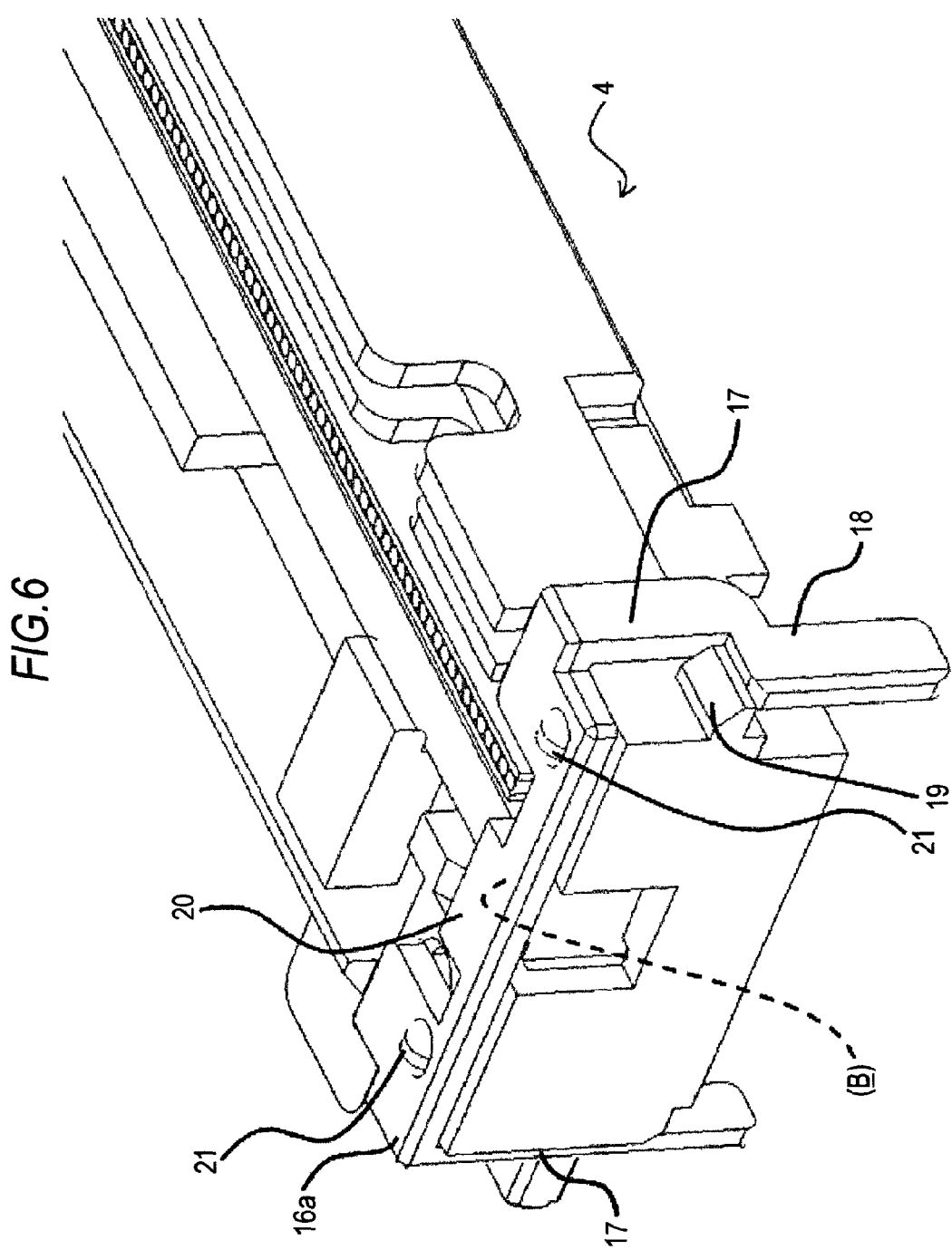
FIG. 6 is a perspective view showing a detailed shape of the spacer 16.

FIG. 4 is a perspective view of a spacer 16 to which the present invention is applicable. FIG. 5 is a perspective view showing a structure of the image sensor unit 4. FIG. 6 is a perspective view showing a detailed shape of the spacer 16.

Reference numeral 15 denotes a frame as a supporting member that supports configurational members. A configuration is adopted in which configurational members, such as a sensor substrate 14 mounted with the light source 10, the light guide 11, the rod lens array 12 and the photoelectric conversion element $13_k$, are attached to and supported by the frame 15 in prescribed positional relationships.

Reference numeral 16 is a spacer formed into a substantially U-shape (the shape may be a rounded shape without edges as with an actual U-shape, or a square-edged shape instead). The spacers 16, as after-mentioned first and second spacers 16a and 16b, are provided at positions for covering respective ends in the longitudinal direction of the image sensor unit 4.

The opposite ends of the spacer 16 are provided with respective supporting members 17. The supporting members 17 are provided with respective hook-shaped fasteners 18.

The fasteners 18 are arranged opposite to each other, and snapped into engagement with respective fastened members 19 provided with the frame 15, and thus attached on the frame 15.

The supporting member 17 has a configuration including a certain extent of elasticity for maintaining the engaged state in a case of being engaged with the fastened member 19 provided at the frame 15.

The distal end of the supporting member 17 has a length protruding from the undersurface of the frame in a case where the spacer 16 is attached to the frame 15. Accordingly, the distal end of the supporting member 17 is disposed in proximity to the inner bottom of the cabinet 1 in a case where the image sensor unit 4 is attached to the cabinet 1.

Thus, when the image sensor unit 4 moves, the distal ends of the supporting members 17 protruding from the opposite ends of the image sensor unit 4 function as stoppers for the electric wiring 8. This allows the moving range of the electric wiring 8 in the main scanning direction to be limited. Accordingly, the electric wiring 8 can be stably positioned within the width of the image sensor unit 4, and a load on electric wiring 8 caused by being sandwiched between the image sensor unit 4 and another element can be reduced.

Reference numeral 20 denotes a light shielding roof, as a light shield, elongated from the spacer 16. The light shielding roof 20 is formed so as to cover the top of the light source 10 (and the end of the light guide 11) in a case of engagement with the image sensor unit 4.

Reference numeral 21 denotes a protrusion. The protrusions 21 are provided at respective two points on the spacer 16.

The spacer 16 is formed of self-lubricating plastic such as, for instance, ultra high molecular weight polyethylene, polyacetal, polyamide or polybutylene terephthalate. Instead, the spacer is formed of plastic including self-lubricating solid lubricant such as, for instance, plastic coated with fluoroplastic or molybdenum disulfide.

Here, the self-lubricating property is that it has a lubricating property by itself and capable of reducing friction and wear without using another lubricant and the like.

In this configuration, the spacers 16 are arranged at respective positions covering the opposite ends of the image sensor unit 4 (frame 15) in the longitudinal direction. That is, the configuration allows the first and second spacers 16a and 16b as slide members to be detachably engaged with one and the other ends, respectively.

Thus, in a case where the image sensor unit 4 is stored in the cabinet 1, the first and second spacers 16a and 16b are inserted between the platen glass 2 and the image sensor unit 4 respectively.

In this case, the opposite ends of the top face of the image sensor unit 4 come into contact with the undersurface of the platen glass 2 via the protrusions 21 provided at the first and second spacers 16a and 16b, respectively.

In this embodiment, the first and second spacers 16a and 16b have the same shapes but inverted from each other, thereby facilitating commonality. However, the shapes may be different from each other instead.

The number of protrusions 21 and the shape of the protrusion 21 are not limited to those in this embodiment.

Figure 7:
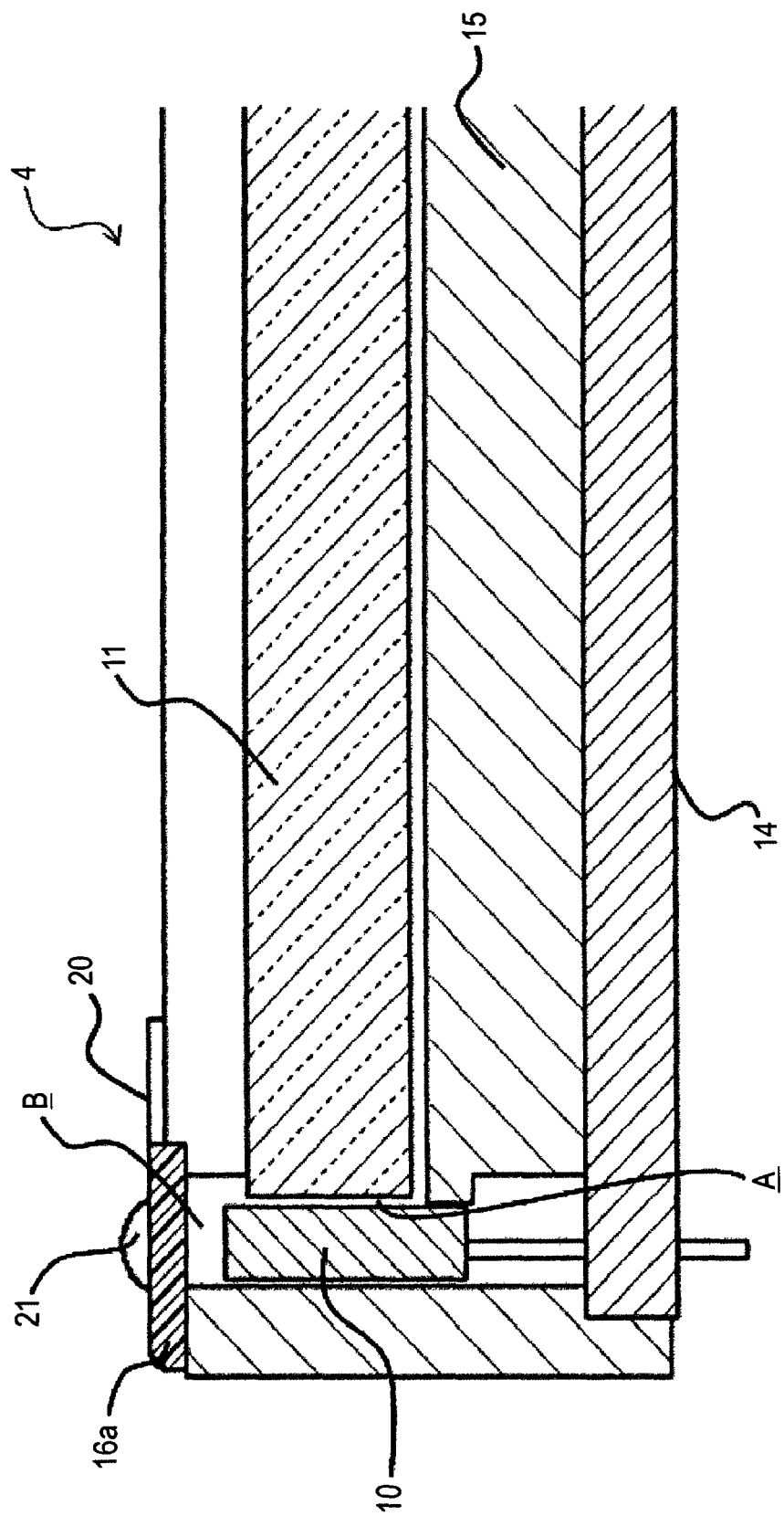
FIG. 7 is a sectional view showing a structure of the image sensor unit 4 in a main scanning direction.

FIG. 7 is a sectional view showing a structure of the image sensor unit 4 in the main scanning direction.

A gap A is provided between the light source 10 and the light guide 11. An airspace B is provided between the light shielding roof 20 arranged at the first spacer 16a and an end of the light guide 11.

Figure 8:
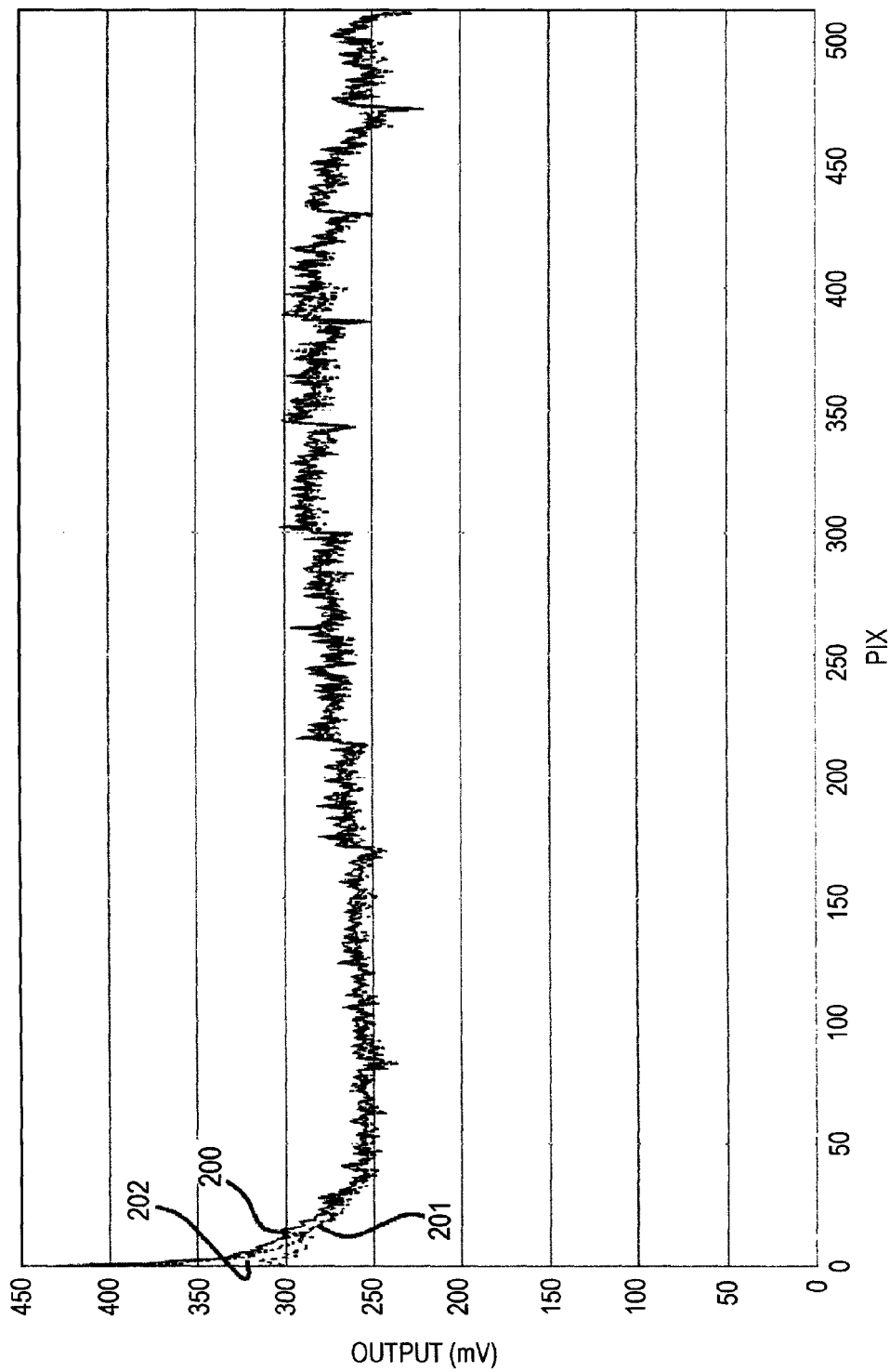
FIG. 8 is a diagram showing illumination distribution in a case of causing a light-emitting element 10r to emit light having an emission wavelength R.
Figure 9:
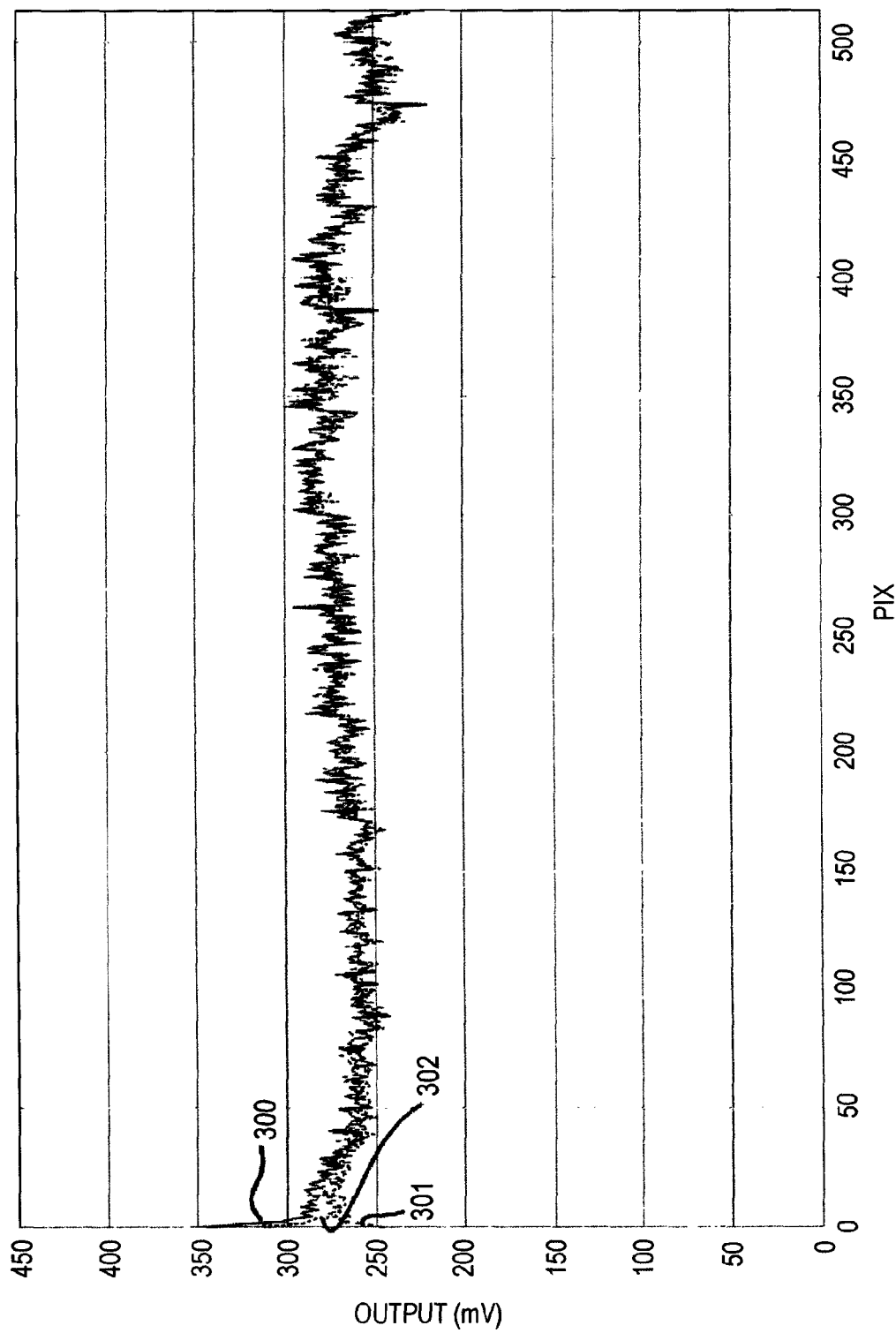
FIG. 9 is a diagram showing illumination distribution in a case of causing a light-emitting element 10b to emit light having an emission wavelength B.
Figure 10:
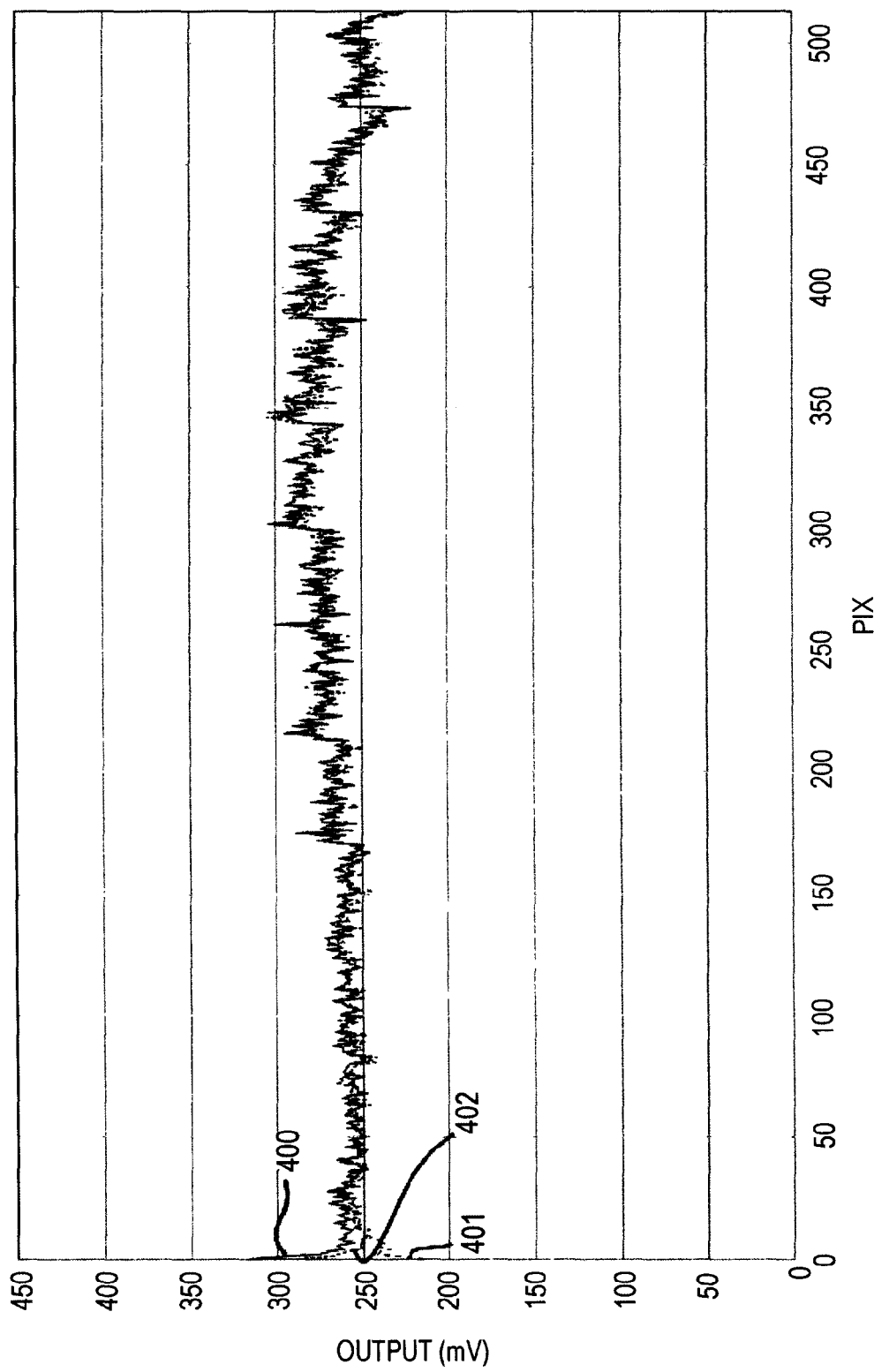
FIG. 10 is a diagram showing illumination distribution in a case of causing a light-emitting element 10g to emit light having an emission wavelength G.
Figure 11:
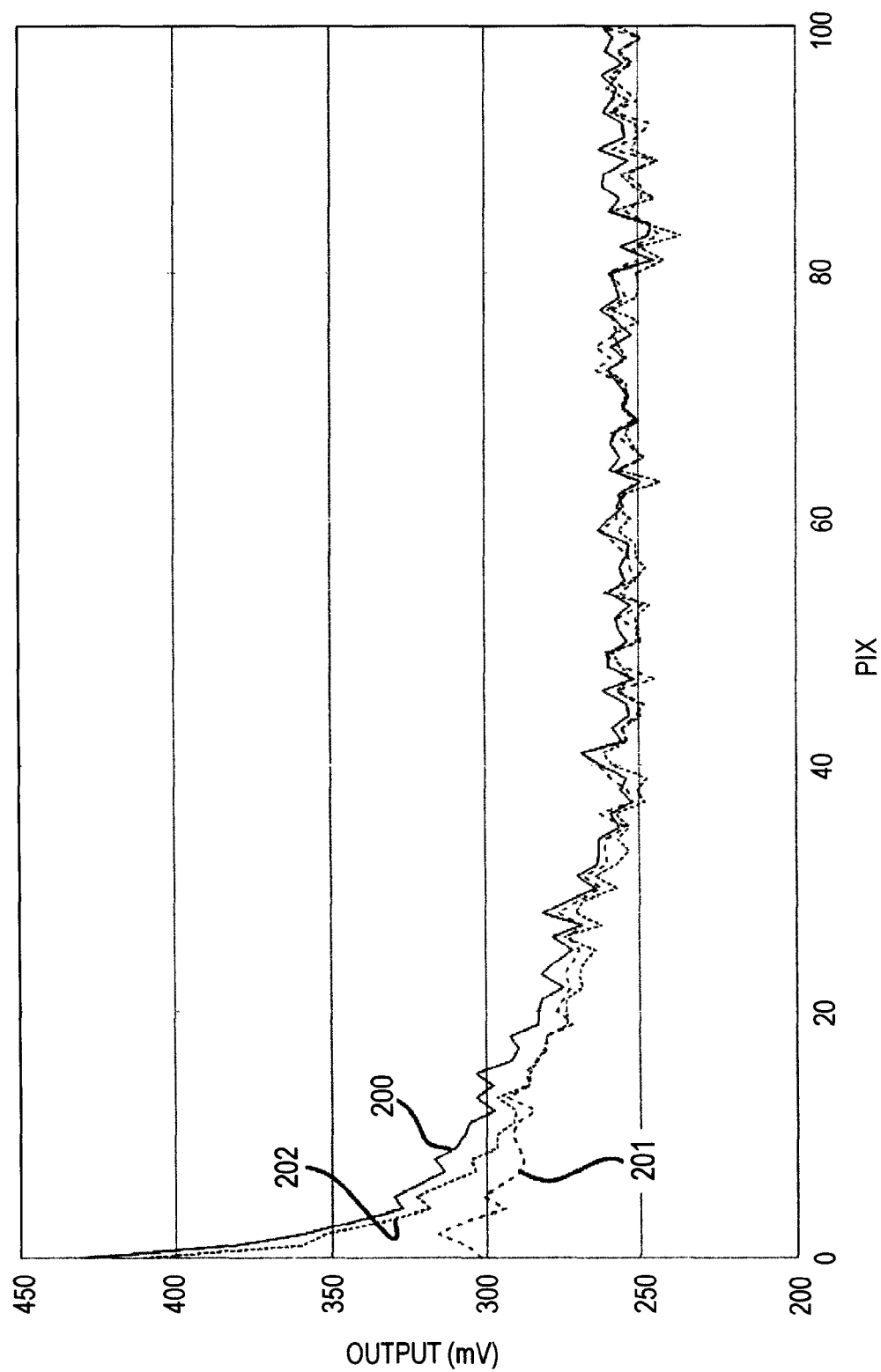
FIG. 11 is a partially enlarged view showing the illumination distribution in the case of causing the light-emitting element 10r to emit the light having the emission wavelength R.
Figure 12:
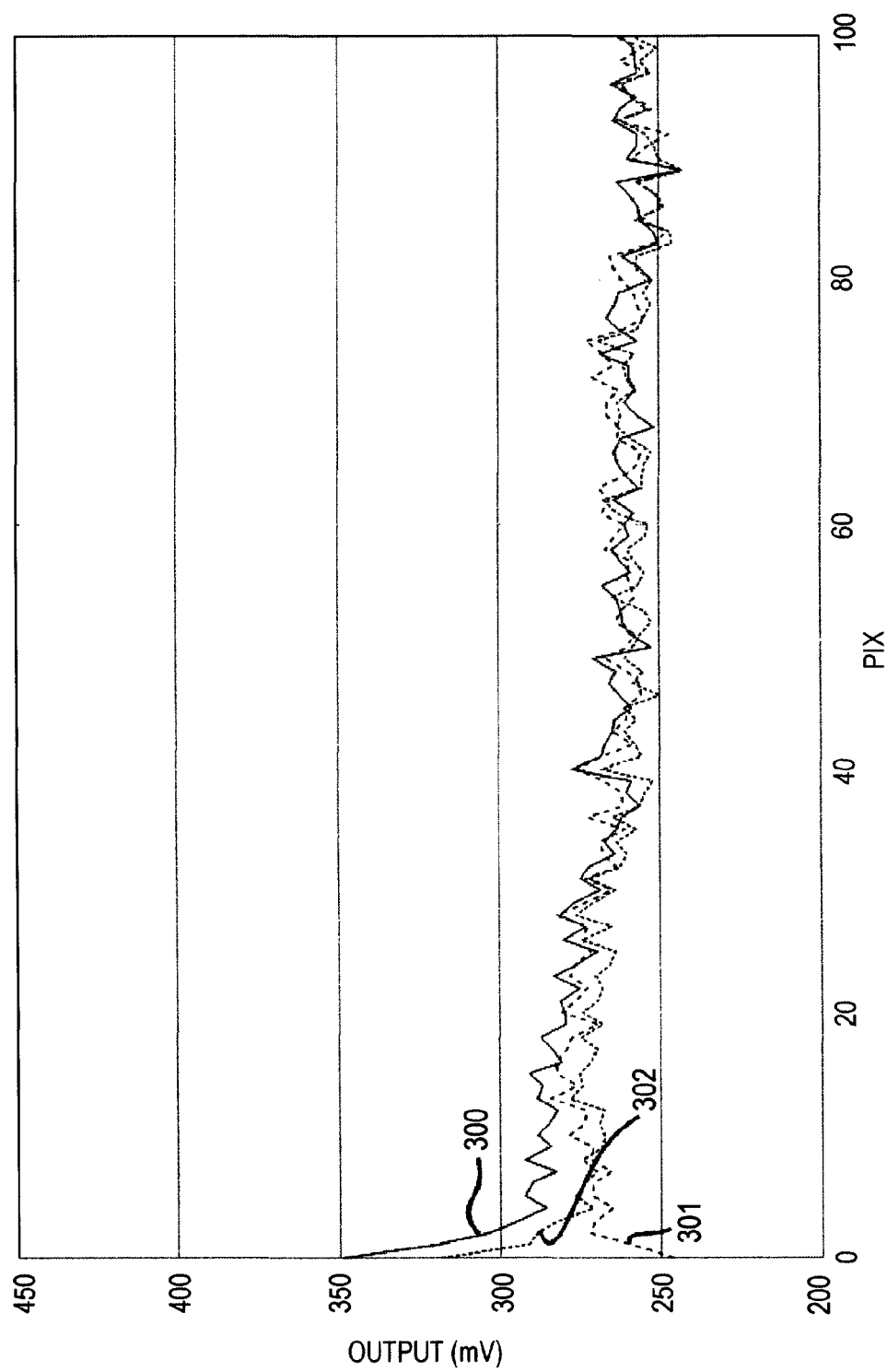
FIG. 12 is a partially enlarged view showing the illumination distribution in the case of causing the light-emitting element 10b to emit the light having the emission wavelength B.
Figure 13:
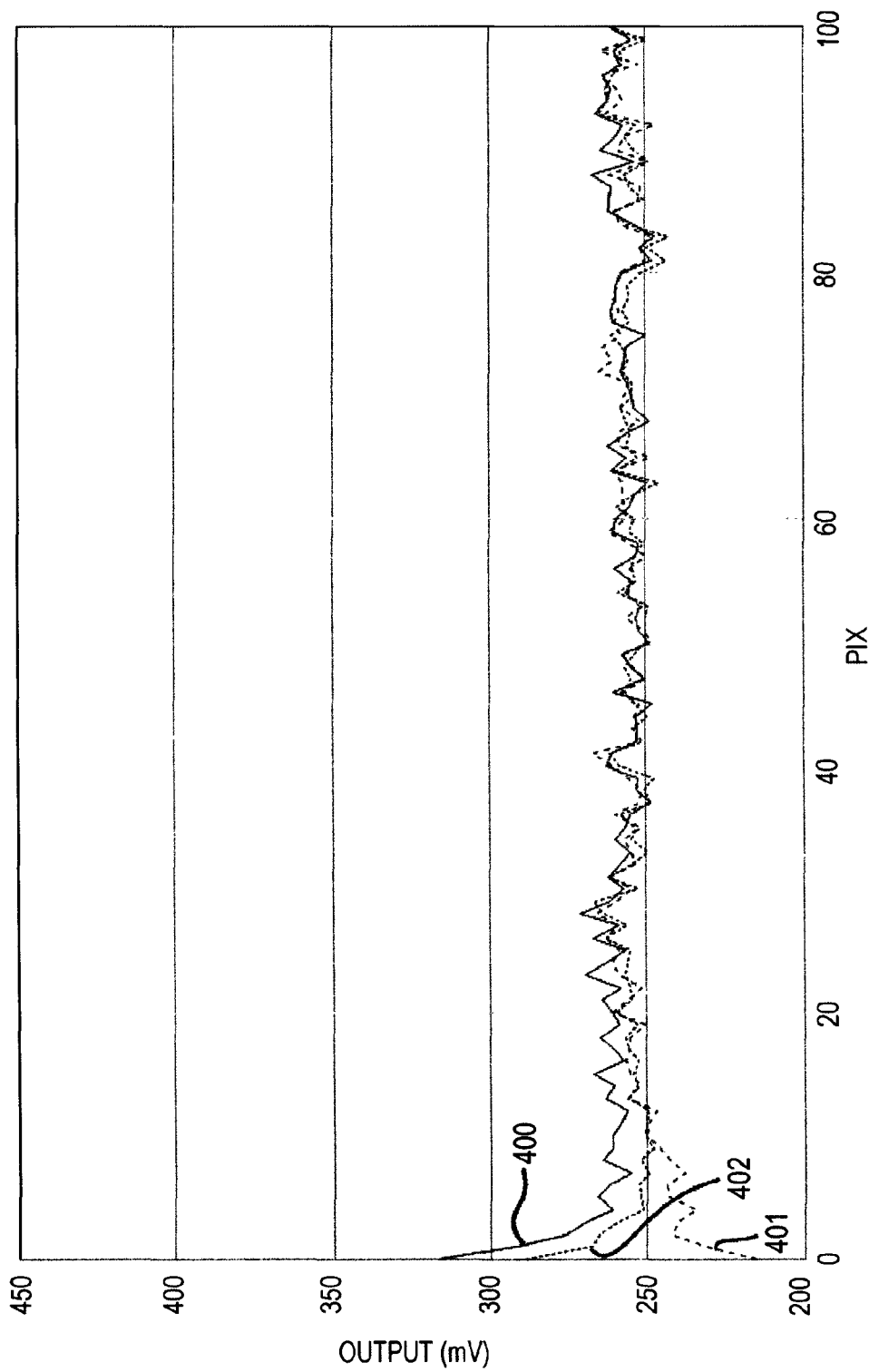
FIG. 13 is a partially enlarged view showing the illumination distribution in the case of causing the light-emitting element 10g to emit the light having the emission wavelength G.

FIGS. 8 to 10 are diagrams showing illumination distribution in a reading range of the image sensor unit 4 of this embodiment, and illustrate illumination distribution in cases of independent emission of RGB in conditions of presence or absence of the light shielding roof 20 and of difference in reflectivity of back of the light shielding roof 20. FIGS. 11 to 13 are partially enlarged views of FIGS. 8 to 10, respectively.

That is, FIGS. 8 and 11 are diagrams showing illumination distribution in a case of causing the light-emitting element 10r to emit light having an emission wavelength R. In the diagrams, reference numeral 200 denotes a line representing illumination distribution in the condition without using the light shielding roof 20. Reference numeral 201 denotes illumination distribution in a condition of including the light shielding roof 20 whose back is the absorbing surface. Reference numeral 202 denotes illumination distribution in a condition of including the light shielding roof 20 whose back is the reflecting surface.

FIGS. 9 and 12 are diagrams showing illumination distribution in a case of causing the light-emitting element 10b to emit light having an emission wavelength B. In the diagrams, reference numeral 300 denotes a line representing illumination distribution in the condition without using the light shielding roof 20. Reference numeral 301 denotes illumination distribution in the condition of including the light shielding roof 20 whose back is the absorbing surface. Reference numeral 302 denotes illumination distribution in the condition of including the light shielding roof 20 whose back is the reflecting surface.

FIGS. 10 and 13 are diagrams showing illumination distribution in a case of causing the light-emitting element 10g to emit light having an emission wavelength G. In the diagrams, reference numeral 400 denotes a line representing illumination distribution in the condition without using the light shielding roof 20. Reference numeral 401 denotes illumination distribution in the condition of including the light shielding roof 20 whose back is the absorbing surface. Reference numeral 402 denotes illumination distribution in the condition of including the light shielding roof 20 whose back is the reflecting surface.

The absorbing surface means that, for instance, a plastic mixed with black pigments having low light reflectivity is employed on the back of the light shielding roof 20 and/or that surface treatment for absorbing light, such as matted black coating, is applied. The reflecting surface means that, for instance, a metallic luster surface (mirror surface) coated with a coating having high light reflectivity.

FIG. 14 is a diagram showing a measured result at a position of 1 PIX in a case of independent emission of RGB under situations of presence and absence of the light shielding roof 20 and of difference in reflectivity of the back of the light shielding roof 20.

Figure 15:
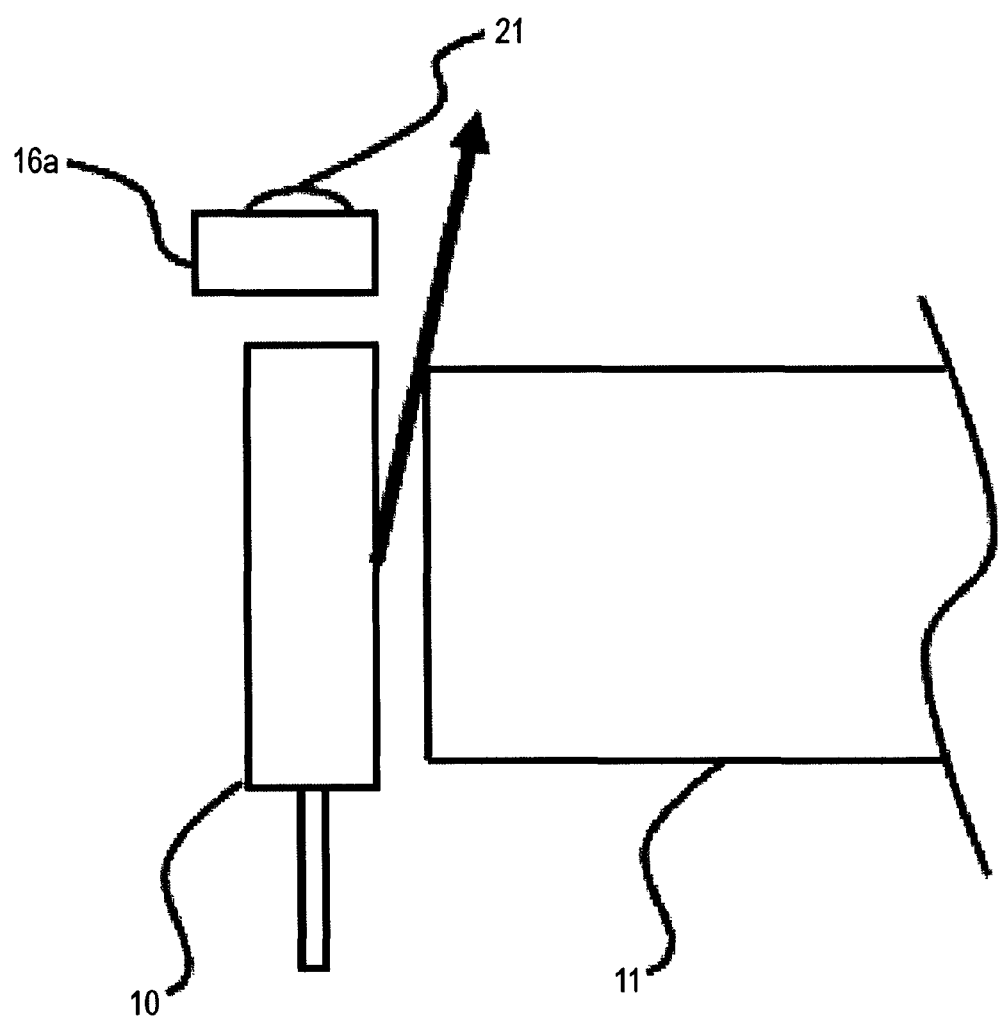
FIG. 15 is a schematic diagram showing a state of reflected light in a condition without using a light shielding roof 20.
Figure 16:
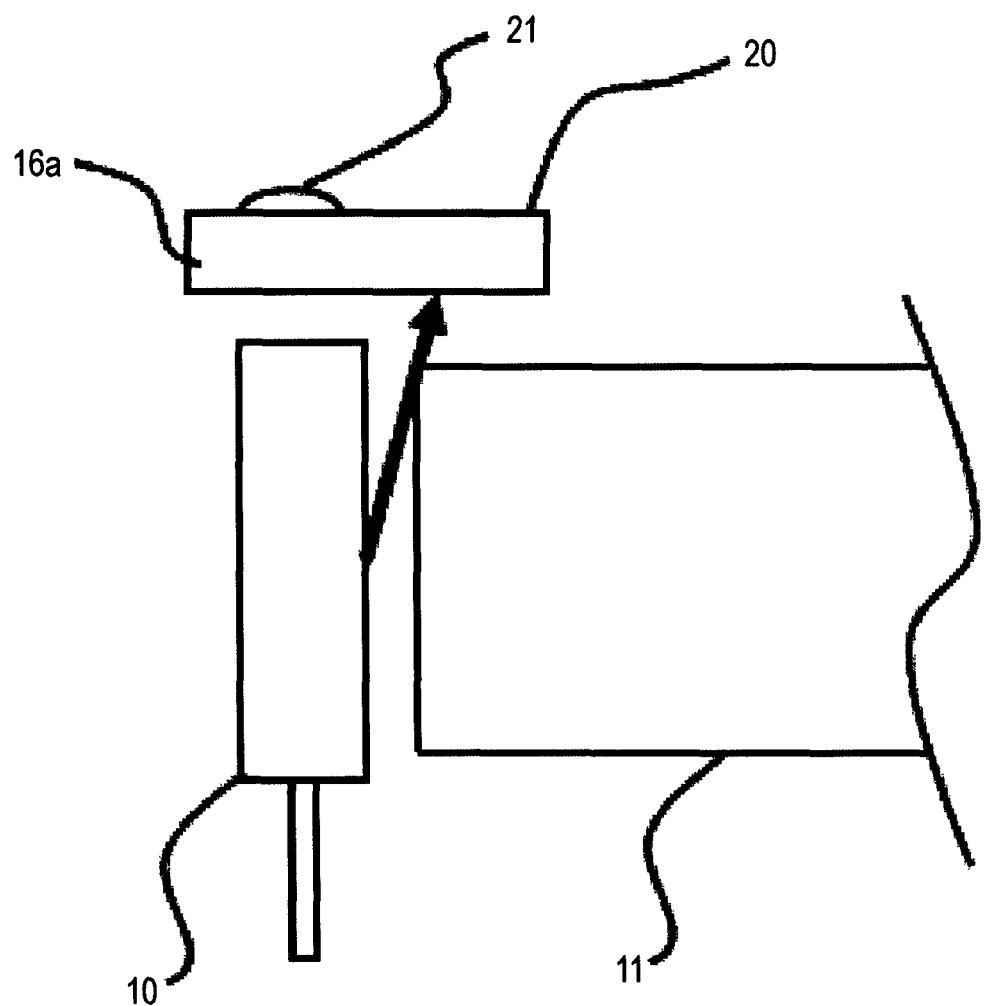
FIG. 16 is a schematic diagram showing a status of reflected light in a condition of including a light shielding roof 20 whose back is an absorbing surface.
Figure 17:
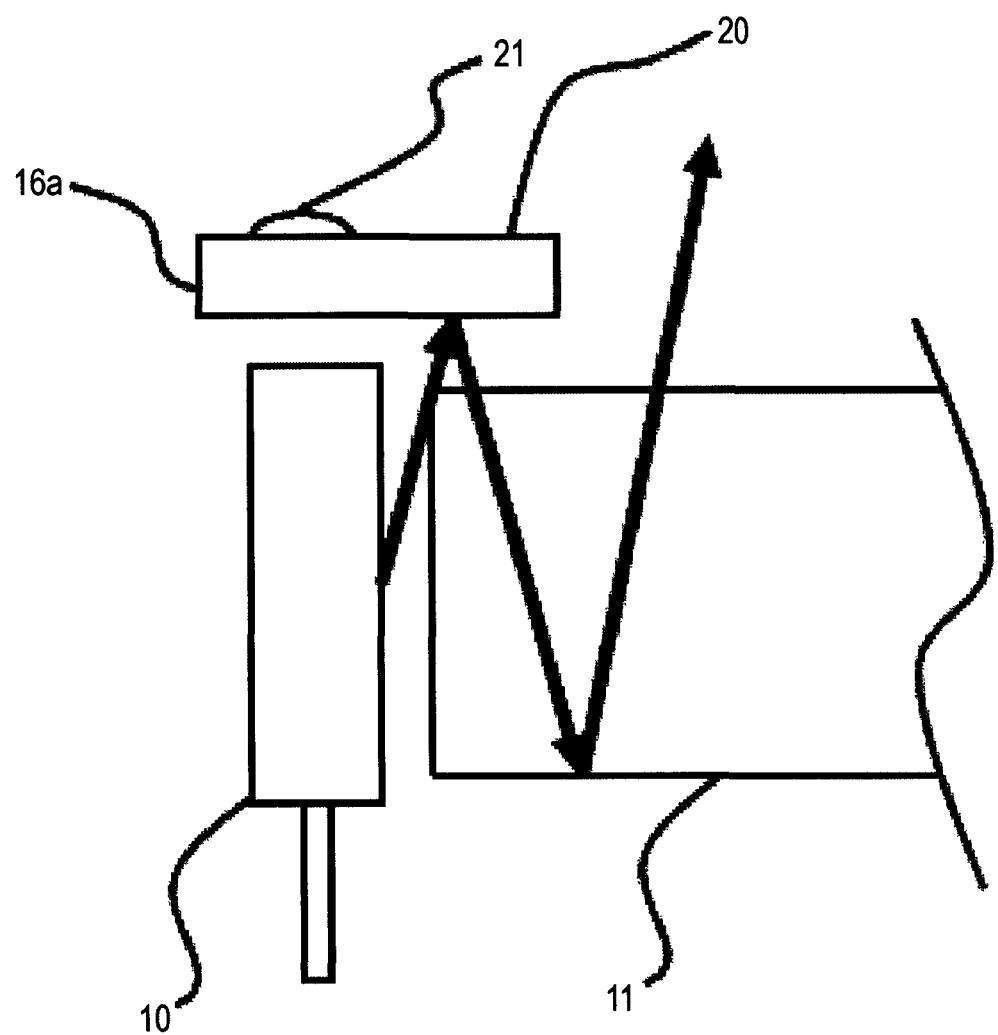
FIG. 17 is a schematic diagram showing a state of reflected light in a condition of including the light shielding roof 20 whose back is the reflecting surface.

FIG. 15 is a schematic diagram showing a state of reflected light in the condition without using the light shielding roof 20. FIG. 16 is a schematic diagram showing a status of reflected light in the condition of including the light shielding roof 20 whose back is the absorbing surface. FIG. 17 is a schematic diagram showing a status of reflected light in the condition of including the light shielding roof 20 whose back is the reflecting surface.

As shown in the figures, in the case of independent emission of RGB, the absorbing surface is thus adopted as the back of the light shielding roof 20; a decreasing rate of 29.4-31.9% is confirmed in comparison with the case without using the light shielding roof 20. Likewise, the reflecting surface is thus adopted as the back of the light shielding roof 20; a decreasing rate of 4.5-8.9% is confirmed.

This exhibits that, since the surface treatment on the back of the light shielding roof 20 improves the decreasing rate in the condition with low reflectivity, the matted black having low reflectivity is suitable. The absorbing surface is thus adopted as the back of the light shielding roof to cause the surface to absorb leakage light, thereby allowing effective light shielding.

Differences in illuminance caused in RGB at a position of 1 PIX is due to differences of attachment positions of the light-emitting elements 10r, 10g and 10b.

That is, provided that, between the light-emitting elements 10r, 10b and 10g and the reading positions of the document S, distances from the light-emitting elements 10r, 10b and 10g to the emission surface 102 are C, D and E, respectively, relationship C<D<E holds. The reason is as follows. In this case, since the gap A is constant, the smaller the distance, the larger the angular apertures of the light-emitting elements 10r, 10b and 10g to the gap A become. Accordingly, the smaller the distances from the light-emitting elements 10r, 10b and 10g to the emission surface 102, the more the leakage light increases.

Figure 18:
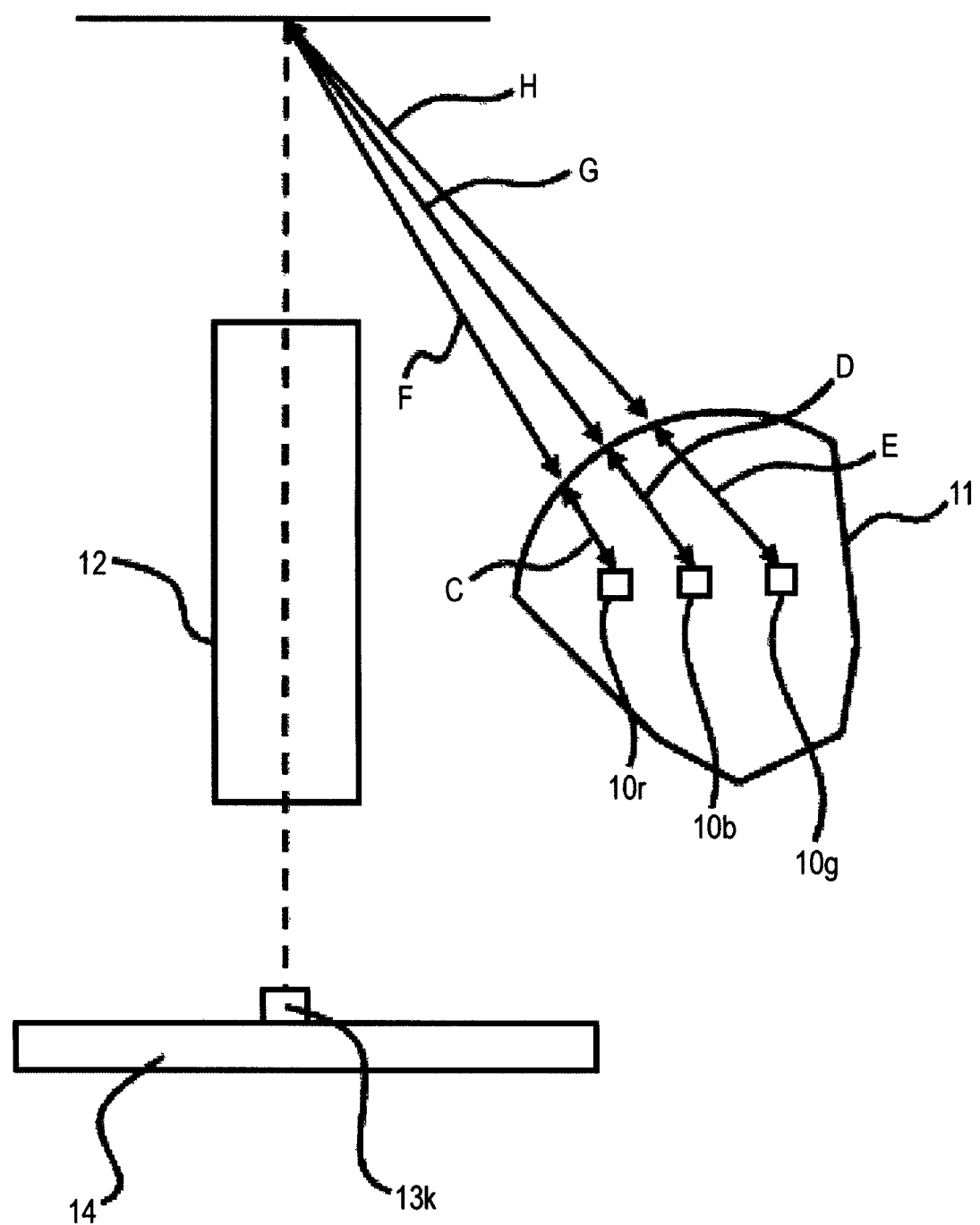
FIG. 18 is a diagram showing positional relationship between the light guide 11 and the light-emitting elements 10r, 10b and 10g.

In addition, provided that, between the light-emitting elements 10r, 10b and 10g and the reading positions of the document S, distances from the emission surface 102 to the reading position of the document S are F, G and H, relationship "(C+F)<(D+G)<(E+H)" holds. Since illuminances are inversely proportional to the squares of the distances from the light-emitting elements 10r, 10b and 10g, the smaller the distances from the light-emitting elements 10r, 10b and 10g to the document reading positions, the more the illuminance of the leakage light increases (see FIG. 18).

In this embodiment, the first and second spacers 16a and 16b are detachably provided on the top face of the image sensor unit 4 (frame 15), and the first spacer 16a includes the light shielding roof 20 elongated so as to cover the light source 10 and the end of the light guide 11.

This allows the leakage light from the gap A to be shielded without addition of a new element, thereby enabling the illumination distribution in proximity to the incident surface 101 to be stabilized. This in turn enables the illumination distribution to be maintained substantially constant across the entire main scanning direction, thereby allowing stable image quality to be acquired.

In addition, this enables the section from the incident surface 101 to the photoelectric conversion element $13_k$ to be shortened, thereby allowing the entire length of the image sensor unit 4 to be reduced.

The spacer 16 is detachably configured, which negates the need of attaching the light guide 11 by sliding and allowing attachment by insertion. This facilitates attachment of the light guide 11, and allows a range of friction caused between the light guide 11 and the frame 15 during attaching the light guide 11 to be reduced. Accordingly, scratches, wear and the like to be caused on the light guide 11 can be prevented.

The spacer 16 has the structure provided with the light shielding roof 20 elongated so as to cover the light source 10 and the end of the light guide 11. This enables commercial products inexpensive in view of cost to be employed as the LED used for the light source 10, thereby facilitating cost reduction.

The protrusion 21 is provided on the top face of the spacer 16. This reduces the contact area with the undersurface of the platen glass 2, thereby allowing the frictional resistance to be reduced, and enabling the contact position to be fixed. This, in turn, not only allows the operation of the image sensor unit 4 to be stabilized, but also enables the distance between the undersurface of the platen glass 2 and the image sensor unit 4 to be constant.

The airspace B is provided between the light shielding roof 20 and the end of the light guide 11, which prevents direct contact even if the light guide is expanded due to thermal expansion, moisture absorption and the like. Accordingly, scratches, wear and the like to be caused on the light guide 11 can be prevented.

The surface treatment for absorbing light on the back of the light shielding roof 20 enables the leakage light to be absorbed, thereby allowing effective light shielding.

In addition, the airspace B is provided between the light shielding roof 20 and the light guide 11. This allows the emission surface 102 at the end of the light guide 11 covered with the light shielding roof 20 to be used as the reflecting surface. Accordingly, even in a case of applying the surface treatment for absorbing light on the back of the light shielding roof 20, light absorption at the contact surface caused when the light shielding roof is close contact with the light guide 11 is eliminated. Since light can be reflected in the light guide 11, light from the light source 10 can efficiently be guided.

Further, the spacer 16 is formed of self-lubricating plastic such as, for instance, ultra high molecular weight polyethylene, polyacetal, polyamide, or polybutylene terephthalate. Accordingly, the integrally formed protrusion 21 can reduce friction and wear to be caused with the back of the platen glass 2. This can prevent scratches, wear and the like from being caused on the undersurface of the platen glass 2

The spacer 16 is formed of plastic including solid lubricant by coating with such as, for instance, fluoroplastic or molybdenum disulfide. This can prevent scratches and wear to be caused on the undersurface of the platen glass 2, while suppressing the cost.

As described above, the frame includes the detachably mounted slide member. The slide member includes the elongated light shield covering the light source and the end of the light guide. Leakage light from the gap between the light source and the light guide can be shielded without adding a new element, thereby enabling illumination distribution in proximity to the light source to be stabilized. This in turn enables the illumination distribution to be maintained substantially constant across the entire main scanning direction, thereby allowing stable image quality to be acquired. In addition, this enables the section from the end of the light guide to the photoelectric conversion element to be shortened, thereby allowing the entire length of the image sensor unit to be reduced.

Further, the slide member is detachably configured, which negates the need of attaching the light guide by sliding and allowing attachment by insertion. This facilitates attachment operation of the light guide. In addition, this allows a range of friction caused between the light guide and the supporting member during attaching the light guide to be reduced. Accordingly, scratches, wear and the like to be caused on the light guide can be prevented.

Further, the slide member has the structure provided with the light shield elongated so as to cover the light source and the end of the light guide. This enables commercial products inexpensive in view of cost to be employed as the light source, thereby facilitating cost reduction.

All the embodiments only describe specific examples for implementing the present invention. The technical scope of the present invention cannot narrowly be construed by these embodiments. That is, the present invention can be implemented in various forms without departing from the technical thought and the primary characteristics.

What is claimed is:

1. An image sensor unit comprising:
   a sensor substrate on which a plurality of photoelectric conversion elements are mounted;
   a light source that includes a light-emitting element and is for illuminating a document;
   a light guide that guides light from the light source from one end face in a longitudinal direction and illuminates the document;
   an image forming element imaging reflected light from the document on the sensor substrate; and
   a frame holding the sensor substrate, the light source, the light guide, and the image forming element,
   wherein the frame includes a detachably mounted slide member disposed in proximity to the light source, and
   wherein the slide member includes an elongated light shield covering the light source and an end of the light guide.

2. The image sensor unit according to claim 1, wherein the light-emitting element includes a plurality of light-emitting diodes.

3. The image sensor unit according to claim 1, wherein the light shield and the light guide are spaced apart so that an air space is provided therebetween.

4. The image sensor unit according to claim 1, wherein the slide member includes a protrusion.

5. The image sensor unit according to claim 1, wherein a back of the light shield has a surface treatment for absorbing light.

6. The image sensor unit according to claim 1, wherein the slide member is formed of self-lubricating plastic.

7. The image sensor unit according to claim 1, wherein the slide member is formed of plastic including a solid lubricant.

8. An image reading apparatus comprising:
   an image sensor unit; and
   an image sensor unit moving device for moving the image sensor unit,
   wherein the image sensor unit comprises:
   a sensor substrate on which a plurality of photoelectric conversion elements are mounted;
   a light source that includes a light-emitting element and is for illuminating a document;
   a light guide that guides light from the light source from one end face in a longitudinal direction and illuminates the document;
   an image forming element imaging reflected light from the document on the sensor substrate; and
   a frame holding the sensor substrate, the light source, the light guide, and the image forming element,
   wherein the frame includes a detachably mounted slide member disposed in proximity to the light source, and
   wherein the slide member includes an elongated light shield covering the light source and an end of the light guide.

9. The image reading apparatus according to claim 8, wherein the light-emitting element includes a plurality of light-emitting diodes.

10. The image reading apparatus according to claim 8, wherein the light shield and the light guide are spaced apart so that an air space is provided therebetween.

11. The image reading apparatus according to claim 8, wherein the slide member includes a protrusion.

12. The image reading apparatus according to claim 8, wherein a back of the light shield has a surface treatment for absorbing light.

13. The image reading apparatus according to claim 8, wherein the slide member is formed of self-lubricating plastic.

14. The image reading apparatus according to claim 8, wherein the slide member is formed of plastic including a solid lubricant.

* * * * *

UNITED STATES PATENT AND TRADEMARK OFFICE
CERTIFICATE OF CORRECTION

| | | |
|---|---|---|
| PATENT NO. | : 8,885,230 B2 | Page 1 of 1 |
| APPLICATION NO. | : 13/315747 | |
| DATED | : November 11, 2014 | |
| INVENTOR(S) | : Hideo Kiyota | |

It is certified that error appears in the above-identified patent and that said Letters Patent is hereby corrected as shown below:

On the title page, item (54) and in the specification, col. 1, line 2, in the title:
"APPARARTUS" should read: -- APPARATUS --.

Signed and Sealed this
Seventeenth Day of February, 2015

Michelle K. Lee
*Deputy Director of the United States Patent and Trademark Office*